May 24, 1955
E. L. TURNER, JR
2,708,867
HEATING AND COOLING STRUCTURE FOR
AUTOMOBILE DRIVE-IN THEATRES
Filed Dec. 10, 1951
2 Sheets-Sheet 1
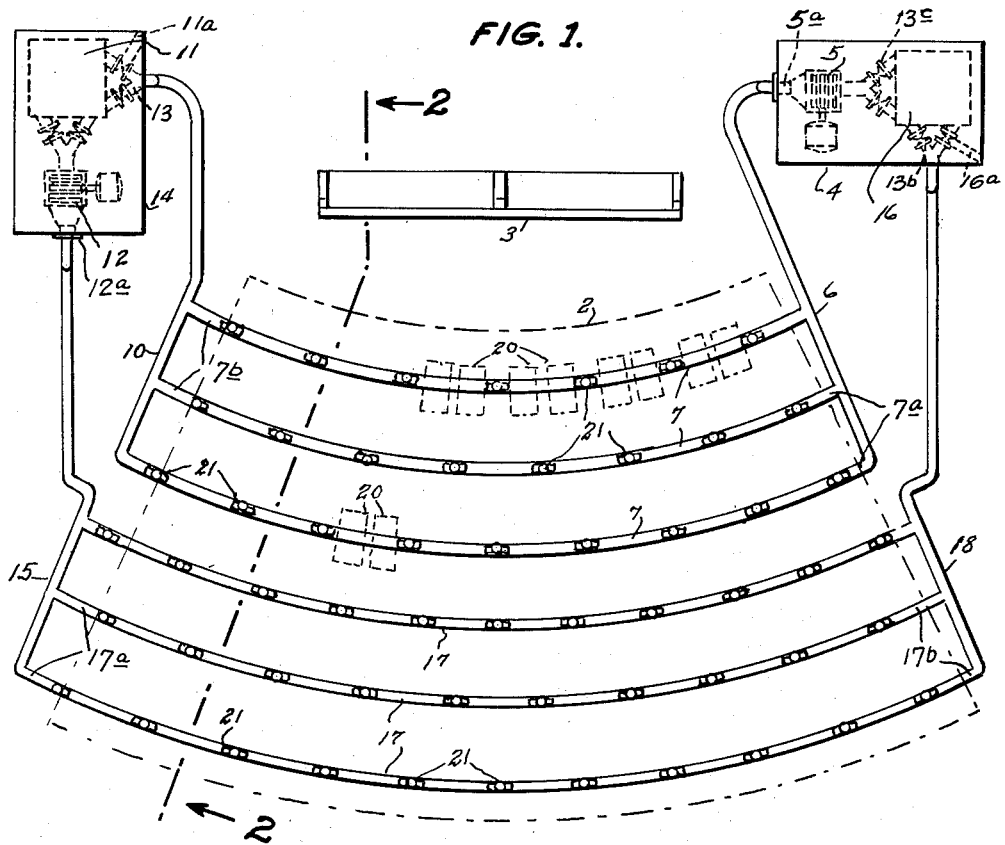
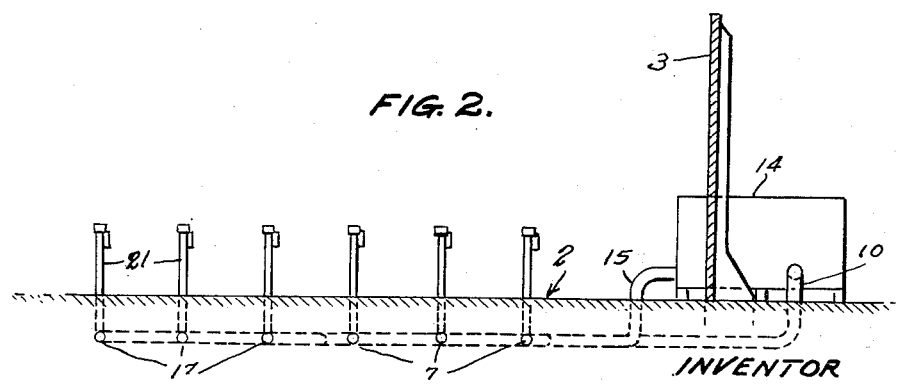
INVENTOR
Emil L. Turner, Jr.,
BY Scott L. Nowell
ATTORNEY

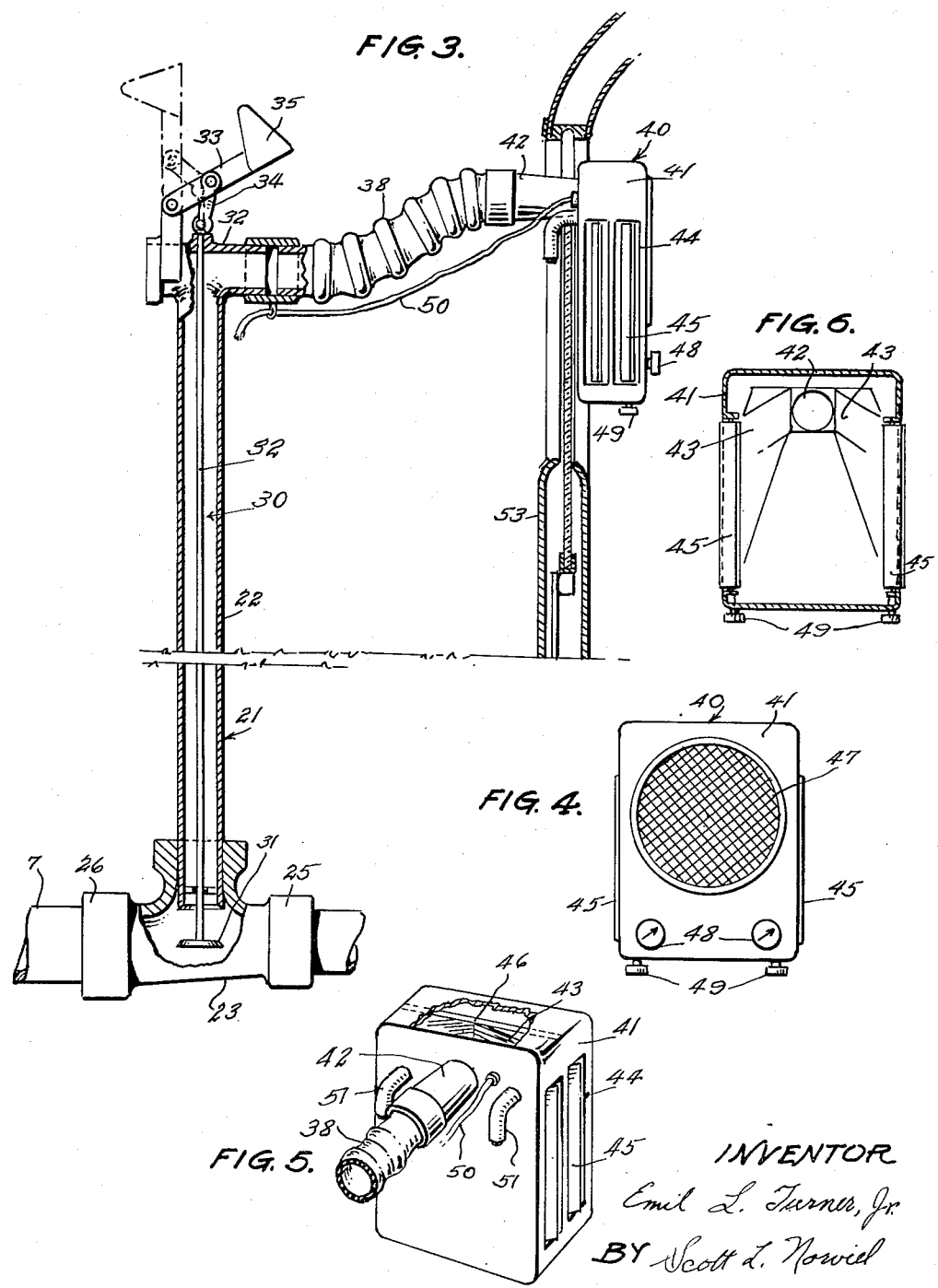

United States Patent Office 2,708,867
Patented May 24, 1955

2,708,867

HEATING AND COOLING STRUCTURE FOR AUTOMOBILE DRIVE-IN THEATRES

Emil L. Turner, Jr., Chandler, Ariz.

Application December 10, 1951, Serial No. 260,895

4 Claims. (Cl. 98—2)

This invention pertains to heating and cooling structure and devices for automobile drive-in theatres.

One of the objects of the invention is to provide heating or cooling underground ducts, through which air of the desired temperature is kept circulating, with tubular standards adjacent automobile parking spaces having flexible tubes carrying combination loud speaker holding boxes and air registers, which can be attached on the inside of the windows of automobiles parked in said spaces.

Another object is to provide an underground duct structure, which will carry air from cooling plants or heating plants, operating near the parking area, to tubular standards positioned adjacent automobile parking spaces, so that circulation is maintained through said duct structure, when desired, in order to maintain the duct walls at a temperature substantially equal to that of the air flowing therethrough, and enable air of the temperature desired instantly available at any one of a plurality of standards.

Another object is to provide a duct structure, as above stated, with a combination of air circulating blowers and control valves, peculiarly suited to said structure, to furnish air of the temperature desired to one or more of standards arranged throughout the automobile parking area.

Still another object is to provide flexible tubing connecting the tops of said standards to combination loud speaker and air distributing boxes constructed so that air may be directed and distributed within an automobile parked adjacent one of said standards, as desired, and so that noise of air traveling through ducts or flowing from said boxes is suppressed and air currents issuing from said boxes do not travel in the same direction as the major portion of sound waves issuing from said loud speaker.

Other objects will appear hereinafter.

I attain the foregoing objects by means of the structure, devices, and combination of parts shown in the accompanying drawings, in which—

Figure 1 is a plan view of an under-ground duct structure and air circulating mechanism for cooling or heating air and distributing it to outlet standards, throughout the parking area of a drive-in theatre;

Figure 2 is a sectional elevation thereof taken substantially on line 2—2, Figure 1;

Figure 3 is an elevation, partially in section, of a duct joint and connection to a standard, drawn on an enlarged scale, and showing the side elevation of an air distributing and loud speaker unit;

Figure 4 is a front elevation of a combination loud speaker and air distribution unit to be used inside an automobile parked adjacent a standard;

Figure 5 is a side elevation thereof; and

Figure 6 is a front elevation thereof with portions of the case broken away to show the interior of the case.

Similar numerals refer to similar parts in the several views.

In the drawings numeral 2 refers to the automobile parking area in front of the screen 3 of a drive-in theatre. A heating and cooling plant is housed in structure 4 and includes a blower 5, which has an outlet 5ª that is connected to one end of an outlet header 6 which parallels one side of the parking area 2. A first series of parallel ducts 7 have their inlet ends 7ª connected to the header 6 and the ducts extend arcuately across the front portion of the area 2 adjacent the screen 3. The opposite outlet ends 7ᵇ of the ducts are joined to a receiving header 10. The receiving header 10 is connected to a heating and cooling plant, which is housed in a structure 14. The header 10 is connected to a Y-fitting 13, which forms an inlet for the air conditioning unit 11, which heats and/or cools the air. The Y-fitting 13 is provided with a conduit 11ª which provides an inlet for fresh air, which is admitted to the unit 11 with the returning air from the header 10. The unit 11 is provided with a Y-fitting outlet 13ª, which communicates with the intake of a blower 12 that is housed in the structure 14. The blower 12 has an outlet 12ª that is connected to a header 15, which is disposed on the same side as the header 10. The header 15 is connected to the inlet end 17ª of a second series of ducts 17, which are disposed across the rear portion of the parking area 2. The ducts 17 have outlet ends 17ᵇ which are connected to a return header 18, which is in turn connected to a Y-fitting 13ᵇ, which forms the inlet for the air conditioning unit 16 in the structure 14. Such unit has a Y-fitting outlet 13ᶜ which is connected to the blower 5. The blower 5 has an outlet 5ª that is attached to the header 6. The inlet 13ᵇ has a conduit 16ª which forms an inlet for fresh air similar to the conduit 11ª in the structure 14. In this way, a continuous re-circulation of conditioning air is achieved.

A complete circuit is thus formed for air traveling through the banks or groups of ducts, 7 and 17, the respective headers, blowers, and heating and cooling plants.

The ducts and headers are buried in the ground of the parking area 2, and may be made of metal, cement, or ceramic ware. At each automobile parking space, indicated by dotted outline, marked 20, there is a standard 21 consisting of a length of vertically extending tubing 22 connected at its particular location to the duct beneath by an especially shaped reducing fitting 23. It is to be noted that the arm of the fitting 24 in which tube 22 is fitted is smoothly curved upward, and that the outlet side and collar 25 is smaller than the inlet side and collar 26. The reduction in size is sufficient to approximately equal the size of the tube 22. The area of the duct may be reduced at each standard by an area approximately equivalent to that of the standard. This arrangement is intended to maintain the effective conductive area of each duct constant throughout its length to supply each standard with adequate flow without increasing velocity of air flow in one portion of the duct relative to that in other portions, and without requiring excessive head pressure in order to maintain equal pressures at all standards.

In some installations it is not necessary to reduce the size of the ducts at each standard fitting, but it is found to be sufficient to reduce the duct diameter at each fourth or fifth fitting. This structure avoids the need for many sizes of duct pipes.

Each standard 21 is provided with a valve 30. The valve plug 31 closes on the bottom of the standard and is sustained on and operated by a rod 32 which extends up through the standard and the T fitting 32 at its top. A lever 33, pivotally attached to the T is connected through link 34 to rod 32 so that swinging motion of the link will open and close the valve plug. When swung upward to the limit of its travel the lever 33 swings beyond dead center, remains upright, and keeps the valve closed until lowered manually. A flag 35 is used to indicate the position of the lever.

Flexible, accordion type, longitudinally extensible tubes 38 are attached to each lateral opening of T 32 on each standard. The outer ends of these T's are attached to air distribution and loud speaker units 40.

These loud speaker units consist of a rectangular case 41 which has a connecting tube 42 in the top portion of its back panel forming an air inlet. The end of the tube is connected to the outer end of a flexible tube 38 in each instance. From the opening in the back of the case there are passageways 43 which lead laterally to rectangular openings 44 in the sides of case 41. These openings are provided with directive slats 45, pivoted at each end so as to turn flatwise and close openings 44, and to turn to various angles edgewise and act as directive vanes to distribute and direct air issuing from these openings to the various parts of the automobile. In the front part of case 41 and separated from passageways 43 by partition 46 there is a recess in which loud speaker 47 is mounted. The speaker, being of the vibrating cone type, faces outward and sound waves are projected principally outward from it and from the front of case 41. The air, meanwhile issues laterally from the openings 44 in the sides of the case. The noise of air flow, and any other noise in the flow, is muffled by the passageways and directed thereby substantially at right angles to the direction of the sound projected from the speaker.

Control knobs 48 are provided on the front panel of each case to regulate the volume of the speaker, knobs 49 turn slats 45 and a coiled flexible conduit 50 is connected to the speaker and extends rearward parallel to, and attached beneath tube 38.

Downwardly bent hooks 51 are attached to the rear panel of the case 41 near each side edge to afford convenient means to attach each unit 40 to the upper edge of an automobile window 52, of the door 53 on automobile.

In use the heating or cooling unit 16 in housing structure 4 which may be termed the first air heating and cooling element is set in operation and blower 5 operated to force this air through the ducts 7. Blower 12 in housing structure 14 which may be termed the second air heating and cooling element is operated to draw any unvented air from ducts 7 and force it, together with additional heated or cooled fresh air, entering from unit 11, through ducts 17. Unvented air is then returned to blower 5 through header 18. When operation is commenced all valves 30 are closed. This condition of the valves is easily observed by the position of flags 35. The blowers are operated until all ducts acquire the temperature, approximately, of the air flowing through them. Thereafter, as automobiles are parked beside each of the standards 21 the valves are opened, and when units of this standard are installed in the automobile, or automobiles thus parked, the amount of airflow vented from each standard is regulated by the pivoted slats 45. The air thus vented from the duct system is supplanted by fresh air drawn in through inlets 16a and 11a, of valves in the Y inlet fittings 13 of the heating and cooling units 16 and 11 which operate in structures 4, and 14, respectively.

In addition to the ducts it is to be understood that there is the usual and conventional wiring (not shown) connecting the conduits 50 to a source of electrical energy on which oscillations to produce sound have been impressed.

The structure makes it possible for patrons of drive-in moving picture theatres to view the screen from their automobiles, listen to the sounds accompanying the pictures and enjoy the comforts afforded by forced draft air cooling and heating.

I claim:

1. In apparatus and structure for heating or cooling automobiles parked in a drive-in moving picture theatre by air flowing through underground ducts to tubular standards disposed adjacent parking spaces in the parking area of said theatre, structure for conveying air from said standards and distributing it within said automobile comprising a flexible and laterally extensible tube connected at its end to said tubular standard, a rectangular air distribution case having a front, back, sides, top and bottom; a partition closing the front portion of the case from the rear portion; an electric loud speaker unit in the front portion of the said case arranged to propagate sound waves outward from the front of said case; an extensible electrical transmission cable attached to said tube, and co-extensive therewith, having its inner end connected electrically to said loud speaker unit; the back of said case being provided with a tube connecting an opening in the upper part of the back of said case with the end of said flexible tube; said case sides having rectangular outlet openings provided with vertically extending closing slats pivoted at each end; and a passageway within the rear portion of said case connecting said opening in the back of said case with said rectangular outlet openings in the sides of said case.

2. In apparatus and structure for heating or cooling automobiles parked in a drive-in moving picture theatre by air flowing through underground ducts to tubular standards disposed adjacent parking spaces in the parking area of said theatre, structure for conveying air from said standards and distributing it within said automobile comprising a flexible and laterally extensible tube connected at its inlet end to said tubular standard, a rectangular air distributing and loud speaker supporting unit, for attachment within an automobile parked within said out-door theatre, having a front panel with an opening to receive a loud speaker unit; a back panel having an opening in the top portion thereof; a partition between said front panel and said back panel dividing said case into a front portion and a rear portion; side panels provided with rectangular outlet openings; vertical slats pivoted at their upper and lower ends within said outlet openings to close said openings or to direct air therefrom at an angle relative to the faces of said sides; a passageway within the rear portion of said case connecting the said opening in the back panel with the openings in the sides thereof; and an electrical loud speaker unit disposed within the front portion of said case to direct sound outward from said front panel, and a connecting tube connecting the opening in the upper portion of the back panel of said case to the inner end of said flexible extensible tube.

3. In a drive-in motion picture theatre having a screen, a parking area in front thereof, transverse rows of automobile parking spaces arranged within said parking area, and electrical wiring connecting said parking spaces for the transmission of energy to electrical loud speakers, the combination therewith of a first air heating and cooling element having an inlet, including a fresh air inlet, an outlet, a power driven blower and an air heating and cooling unit disposed within a housing structure adjacent one side of said parking area; a second air heating and cooling element having an inlet, including a fresh air inlet, an outlet, a power driven blower and an air heating and cooling unit disposed within a housing structure, located on the side of said parking area opposite said first heating and cooling unit; a first series of ducts extending transversely of said parking area beneath each row of parking spaces in the front portion of said parking area near said screen and having inlet ends adjacent said first air heating and cooling element, means connecting said inlet ends to the outlet thereof, said ducts having outlet ends adjacent said second air heating and cooling element, means connecting said outlet ends to the inlet of said second air heating and cooling element; a second series of ducts extending through the ground beneath rows of parking spaces in the rear portion of said parking area and having inlet ends adjacent said second element, means connecting said inlet ends of the second series of ducts to the outlet of said second element, said second series of ducts having outlet ends adjacent said first air heating and cooling element, means connecting said outlet ends of the second series of ducts to the inlet of said first element; T fittings included in said ducts adjacent each of said parking spaces; standards connected to said fittings extending upwardly from said fittings, adjacent each of said parking spaces, having valves to shut off flow of air therethrough; flexible extensible tubes having their inner ends connected to the upper ends of said standards; and loud speaker cases having hollow backs forming air distribution chambers, inlet connections in the back of said chambers, and lateral outlets from said chambers provided with pivoted closing shutters, connected to the outer ends of said extensible tubes.

4. In a drive-in motion picture theatre having a screen, a parking area in front thereof, transverse rows of automobile parking spaces arranged within said parking area, and electrical wiring connecting said parking spaces for the transmission of energy to electrical loud speakers, the combination therewith of a first air heating and cooling element having an inlet, including a fresh air inlet, an outlet, a power driven blower and an air heating and cooling unit disposed within a housing structure adjacent one side of said parking area; a second air heating and cooling element having an inlet, including a fresh air inlet, an outlet, a power driven blower and an air heating and cooling unit disposed within a housing structure, located on the side of said parking area opposite said first heating and cooling unit; a header connected to the outlet of the said first air heating and cooling element; a plurality of ducts buried in the soil extending from said header beneath rows of said parking spaces near the front portion of said parking area; a second header on the said opposite side of said parking area connected to the opposite ends of said ducts and having an outlet connected to the inlet of said second heating and cooling element; a second group of transversely extending ducts in the rear portion of said parking area; a header on the ends of said second group of ducts and connected to the ends of said ducts adjacent said second air heating and cooling element and having an inlet connected to the outlet of said second element; a second header connected to the opposite ends of said ducts in the rear portion of said parking area and to the inlet of said first air heating and cooling unit; T fittings disposed in said ducts adjacent each parking space; tubular standards extending vertically from each of said T fittings having T's at the tops; valves operating on the bottom ends of said standards controlled by rods extending vertically through said standards and operated by levers on top of the T's on said standards; flexible tubes connected to said T's on top of said standards; and rectangular air distributing boxes including loud speaker units, on the ends of said flexible tubes having hooks for attachment within an automobile.

References Cited in the file of this patent

UNITED STATES PATENTS

| | | |
|---|---|---|
| 29,872 | Fuller | Sept. 4, 1860 |
| 1,335,526 | Perry | Mar. 30, 1920 |
| 2,521,654 | Sandler | Sept. 5, 1950 |
| 2,529,425 | Sharp | Nov. 7, 1950 |
| 2,614,478 | Herman, Jr. | Oct. 21, 1952 |

OTHER REFERENCES

Article by Carl F. Boester, Heating and Ventilating, July 1949.